A. INGALLS
Broadcast-Seeder.
No 36,521 Patented Sept. 23. 1862.
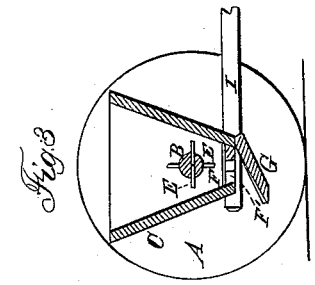
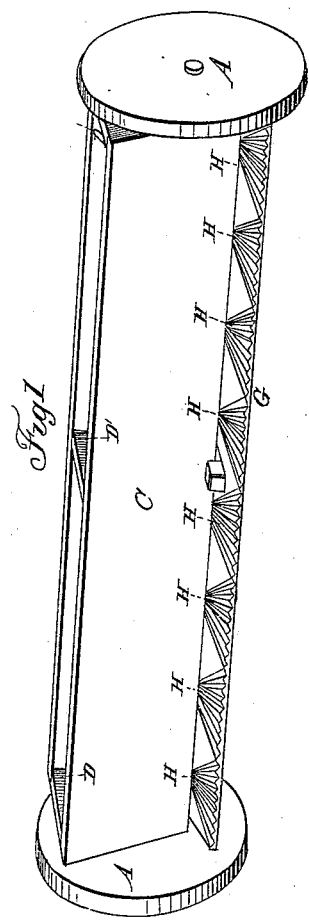
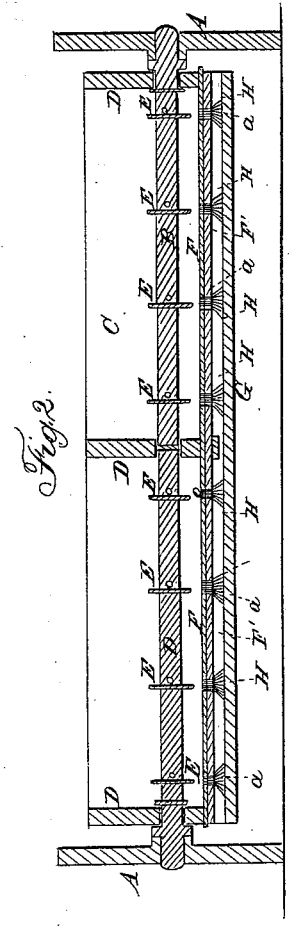
Witnesses
S. W. Hart
J. J. Whalt
Inventor
Alfred Ingalls

UNITED STATES PATENT OFFICE.

ALFRED INGALLS, OF INDEPENDENCE, IOWA.

IMPROVEMENT IN SEEDING-MACHINES.

Specification forming part of Letters Patent No. 36,521, dated September 23, 1862.

*To all whom it may concern:*

Be it known that I, ALFRED INGALLS, of Independence, in the county of Buchanan and State of Iowa, have invented new and useful Improvements in Seeding-Machines; and I do hereby declare that the following is a full and complete description of the construction and operation of the same, reference being had to the accompanying drawings, making part of this specification, in which—

Figure 1 is a perspective view. Fig. 2 is a longitudinal vertical section, and Fig. 3 is a transverse section.

Like letters refer to like parts in the several views.

My improvement consists in such a construction and arrangement of devices that by means thereof wheat and other cereal seeds can be sown broadcast in an expeditious and uniform manner, the machine thus produced being cheap in its construction, effective in use, and durable in action.

A A represent the wheels, and B B represent the axle-trees. The wheels are made fast to the axle-trees and turn with them.

C represents the grain box or hopper. This may be of any desired length—say six or eight feet. The depth may be from twelve to sixteen inches deep. This box or hopper contains the seed to be sown.

The end pieces, D, form the boxes for the axle-trees, which they fit close to the wheels, as seen in Fig. 2.

In the middle of the hopper is placed a partition, D', which forms the support of the inner ends of the two axle-trees which meet at this point. By this arrangement the wheels can turn in opposite directions and the machine can be turned around with ease.

The axle-trees are provided at regular intervals—say two or three inches—with short pins E, which stir the seed and keep it from clogging, and thus aiding in its passage through the feed-openings.

The grain-hopper C is wide at the top and narrow at the bottom, as seen in Fig. 3, leaving just sufficient room at the bottom for the pins E to revolve.

Immediately below the axle-tree, and forming the bottom of the hopper, is a slider, F, made of tin plate or other thin material, and having holes through it at regular intervals, which agree in their distance and position with the position of the pins E in the axle-trees. This slider rests upon the true bottom of the hopper F', which has holes *a* to correspond with those of the slider F. The slider F can be shifted so as to wholly close the holes *a*, or to reduce the size of the openings to any desired degree, thereby regulating the quantity of grain or seed discharged.

Directly below the openings *a* is placed a distributing-apron, G. This is attached to the forward and under edge of the grain-hopper, as seen in Fig. 3. It inclines backward and downward, and is provided with radial grooves H from each of the openings *a* in the bottom of the seed-hopper, and as the seed falls through the openings *a* as the machine is drawn over the ground it is carried along these radial grooves H from each of the openings *a* to the lower margin of the apron G, from whence the seed is distributed evenly over the ground.

I represents the neap by which the seeder is guided and drawn over the ground.

After the seed are sown they are covered by the action of a harrow or otherwise, as may be desired.

What I claim as my improvement, and desire to secure by Letters Patent, is—

The revolving axle-trees B B and pins E, in combination with the hopper C, slider F, distributing-apron G, and grooves H, when these parts are arranged and operated as and for the purpose specified.

ALFRED INGALLS.

Witnesses:
S. W. HART,
J. J. WHAIT.